(12) United States Patent
Stratford et al.

(10) Patent No.: US 9,191,912 B2
(45) Date of Patent: Nov. 17, 2015

(54) SYSTEMS AND METHODS FOR LOCATION DETERMINATION

(71) Applicant: ADC Telecommunications, Inc., Shakopee, MN (US)

(72) Inventors: Scott Stratford, Campbell, CA (US); Larry G. Fischer, Waseca, MN (US); Lance K. Uyehara, San Jose, CA (US)

(73) Assignee: ADC Telecommunications, Inc., Berwyn, PA (US)

( * ) Notice: Subject to any disclaimer, the term of this patent is extended or adjusted under 35 U.S.C. 154(b) by 132 days.

(21) Appl. No.: 14/037,773

(22) Filed: Sep. 26, 2013

(65) Prior Publication Data
US 2015/0087329 A1    Mar. 26, 2015

(51) Int. Cl.
| | | |
|---|---|---|
| H04M 11/04 | (2006.01) | |
| H04W 24/00 | (2009.01) | |
| H04B 7/14 | (2006.01) | |
| H04W 64/00 | (2009.01) | |

(52) U.S. Cl.
CPC ...................................... *H04W 64/00* (2013.01)

(58) Field of Classification Search
CPC ............................... H04W 64/00; H04W 4/02
USPC ................... 455/404.2, 456.1–456.6, 457, 16
See application file for complete search history.

(56) References Cited

U.S. PATENT DOCUMENTS

| | | |
|---|---|---|
| 4,433,335 A | 2/1984 | Wind |
| 4,648,089 A * | 3/1987 | Hsing ............................ 370/267 |
| 4,799,062 A | 1/1989 | Sanderford, Jr. et al. |
| 4,965,820 A * | 10/1990 | Sharpe et al. .................. 370/277 |
| 5,280,472 A | 1/1994 | Gilhousen et al. |
| 5,317,323 A | 5/1994 | Kennedy et al. |
| 5,327,144 A | 7/1994 | Stilp et al. |
| 5,512,908 A | 4/1996 | Herrick |
| 5,513,176 A | 4/1996 | Dean et al. |
| 5,533,011 A | 7/1996 | Dean et al. |
| 5,621,414 A | 4/1997 | Nakagawa |
| 5,784,028 A | 7/1998 | Corman et al. |

(Continued)

FOREIGN PATENT DOCUMENTS

EP     1448008     8/2004

OTHER PUBLICATIONS

International Search Authority, "International Search Report and Written Opinion for Application Serial No. PCT/US2014/057825", "from Foreign Counterpart to U.S. Appl. No. 14/037,773", Jun. 19, 2015, pp. 1-14.

*Primary Examiner* — Dung Hong
(74) *Attorney, Agent, or Firm* — Fogg & Powers LLC

(57) ABSTRACT

Embodiments described by the present disclosure provide improved systems and methods for determining the location of a mobile device. In one embodiment, a system comprises a distributed antenna system (DAS) configured to relay signals to and from the mobile device. Further, the DAS comprises a hub unit; and multiple remote antenna units coupled to the hub unit, wherein signals relayed between the remote antenna units and the hub unit are delayed such that different signal paths between the remote antenna units and the hub unit have different delay times. The system also comprises a base station coupled to the hub unit, wherein the base station receives the signals from the hub unit and determines the delay of signals transmitted between the mobile device and the base station, wherein the system determines the location of the mobile device by using the delay for RF pattern matching.

23 Claims, 4 Drawing Sheets

(56) References Cited

U.S. PATENT DOCUMENTS

| | | | |
|---|---|---|---|
| 5,797,093 A * | 8/1998 | Houde .................. 455/404.1 |
| 5,945,948 A | 8/1999 | Buford et al. |
| 6,084,547 A | 7/2000 | Sanderford et al. |
| 6,111,541 A | 8/2000 | Karmel |
| 6,127,975 A | 10/2000 | Maloney |
| 6,175,308 B1 | 1/2001 | Tallman et al. |
| 6,181,253 B1 | 1/2001 | Eschenbach et al. |
| 6,201,803 B1 | 3/2001 | Munday et al. |
| 6,204,813 B1 | 3/2001 | Wadell et al. |
| 6,236,365 B1 * | 5/2001 | LeBlanc et al. ............ 342/457 |
| 6,249,680 B1 * | 6/2001 | Wax et al. ................ 455/456.2 |
| 6,393,294 B1 | 5/2002 | Perez-Breva et al. |
| 8,005,050 B2 | 8/2011 | Scheinert et al. |
| 8,222,966 B2 * | 7/2012 | Ravi et al. ................ 332/144 |
| 2004/0258100 A1 | 12/2004 | Jantti et al. |
| 2005/0035897 A1 | 2/2005 | Perl et al. |
| 2005/0153712 A1 | 7/2005 | Osaka et al. |
| 2008/0119208 A1 | 5/2008 | Flanagan et al. |
| 2008/0232328 A1 * | 9/2008 | Scheinert et al. ............ 370/335 |
| 2011/0028157 A1 | 2/2011 | Larsen |
| 2012/0062331 A1 * | 3/2012 | Ravi et al. ................ 332/144 |
| 2012/0327918 A1 * | 12/2012 | Yi et al. ................... 370/337 |

\* cited by examiner

SYSTEMS AND METHODS FOR LOCATION DETERMINATION

BACKGROUND

Diversity in signals received from transmitters located at different locations can be used to identify the location of a receiver in reference to the transmitter locations. For example, Global Positioning System (GPS) satellites use trilateration to identify the location of GPS receivers, where the individual GPS satellites transmit different signals to a GPS receiver. In a similar example, the location of a mobile device is determined during communication with multiple cellular towers through the differences in signals communicated between the individual cellular towers and the mobile device. For example, the location can be determined by comparing the time of arrival of the signals at the separate towers along with information for identifying the location of the cellular towers. However, in some communication systems (such as distributed antenna systems) a base station receives a signal from a mobile device that represents multiple signals that were relayed along multiple transmission paths and combined in a distributed antenna system. Because the base station is unable to distinguish the different transmission paths from the relayed signal, the base station is unable to determine the location of the mobile device unless the delays through the DAS are known.

SUMMARY

Embodiments described by the present disclosure provide improved systems and methods for determining the location of a mobile device. In one embodiment, a system comprises a distributed antenna system (DAS) configured to relay signals to and from the mobile device. Further, the distributed antenna system comprises a hub unit; and a plurality of remote antenna units coupled to the hub unit, wherein signals relayed between the plurality of remote antenna units and the hub unit are delayed such that at least two signal paths between the plurality of remote antenna units and the hub unit have different delay times. The system also comprises a base station coupled to the hub unit, wherein the base station receives the signals from the hub unit and determines the delay of signals transmitted between the mobile device and the base station. Further, the system is configured to determine the location of the mobile device by using the delay determined by the base station using RF pattern matching techniques.

DRAWINGS

Reference characters denote like elements throughout figures and text.

DETAILED DESCRIPTION

Figure 1:
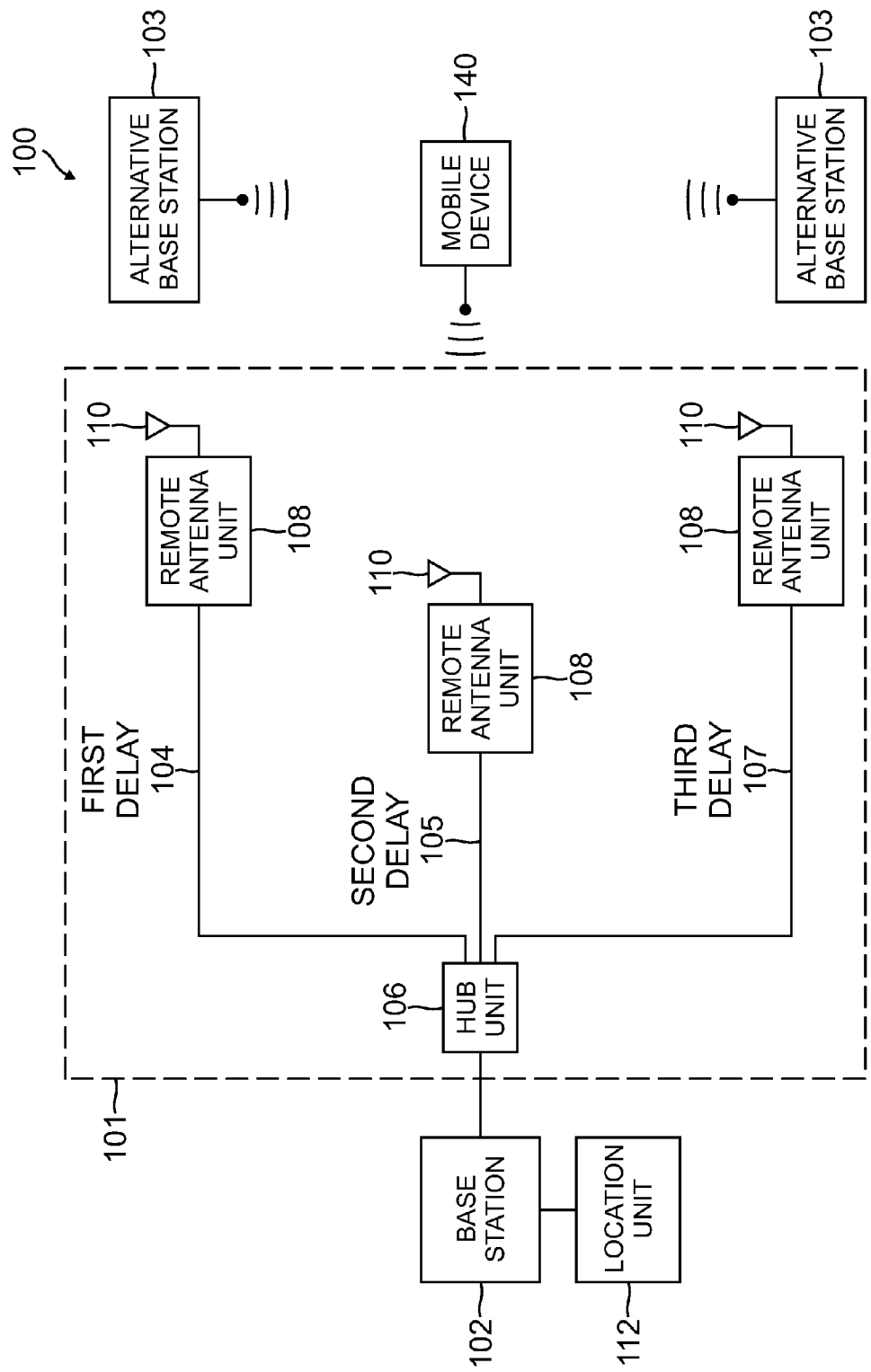
FIG. 1 is a block diagram of one high-level embodiment of a communication network enabled to determine the location of a mobile device.

FIG. 1 is a block diagram illustrating one embodiment of a communication system 100 for determining the location of a mobile device 140. Communication system 100 includes a base station 102 that is communicatively coupled to a distributed antenna system (DAS) 101. In at least one implementation, the base station 102 determines the location of the mobile device 140 using RF pattern matching, wherein the base station 102 identifies different RF characteristics for the possible locations of the mobile device 140. To communicate with the mobile device 140, DAS 101 relays radio frequency signals between one or more upstream devices (for example, base station 102, wireless access points, or other sources of radio frequency signals) and one or more downstream wireless devices (for example, mobile device 140). In some embodiments, base station 102 is part of a telecommunication service providers' infrastructure and mobile device 140 is customer equipment. In general, for each radio frequency signal or channel over which base station 102 communicates with a downstream mobile device 140, an original downlink radio frequency signal is originally transmitted by base station 102 for reception by one or more mobile devices 140 and an original uplink radio frequency signal is originally transmitted by a mobile device 140 for reception by base station 102.

Base station 102 manages communication among wireless terminals (such as mobile device 140) and between the wireless terminals and other communication networks (such as alternative base stations 103) that are coupled to base station 102. In one embodiment, base station 102 manages communication between mobile device 140 and a public switched telephone network (PSTN). In this embodiment, for example, communication network 100 is a cellular/PCS system and base station 102 communication with a base station controller which acts as a voice/PSTN gateway to the PSTN. In another embodiment, base station 102 manages communication between mobile device 140 and an internet protocol (IP)-based network (such as the internet) via communication with an IP gateway. In this embodiment, base station 102 performs baseband processing on IP data from an IP gateway and places the IP data onto a channel. In another implementation, base station 102 is an IEEE 802.16 compliant base station. Optionally, base station 102 may also meet the requirements of WiMax, WiBro, LTE, or other consortium. In yet other embodiments, base station 102 comprises multiple functionalities including managing communications between both a PSTN and an IP-based network.

In at least one exemplary embodiment, DAS 101 comprises a hub unit 106 communicatively coupled to base station 102, and remote antenna units 108 located remotely from and communicatively coupled to hub 106. Each remote antenna unit 108 includes one or more antennas 110, which are used to communicate wirelessly with mobile device 140. In some implementations, hub 106 is optically coupled to base station 102, although in other implementations, hub 106 and base station 102 are communicatively coupled by coaxial cables, wireless antennas, or other communication medium. Similarly, hub 106 is communicatively coupled to remote antenna units 108 through optical fiber, coaxial cables, wireless antennas, or other communication medium. Hub 106 combines the signals received from the remote antenna units 108 and then relays the combined signal to base station 102. In at least one exemplary implementation, hub unit 106 digitally combines the signals received from the multiple remote antenna units 108 using a digital summer. Alternatively, hub unit 106 uses an analog summer to combine the signals received from the multiple remote antenna units 108. Further, hub unit 106 receives a signal from base station 102 and relays the signal to the multiple remote antenna units 108.

Base station 102 uses DAS 101 to communicate with mobile device 140 via antennas 110. Bidirectional communication between base station 102 and a plurality of mobile devices 140 is accomplished through use of a multiple access scheme. In one embodiment, base station 102 and mobile devices 140 communicate using a code-division multiple access (CDMA) scheme. In another embodiment, base station 102 and mobile devices 140 communicate using an orthogonal frequency division multiple access (OFDMA) scheme. In other embodiments, other multiple access schemes are used (e.g. TDMA, FDMA), or more than one multiple access scheme is used including, for example, CDMA for voice communications and OFDMA for data communications.

Mobile device 140 is an electronic device capable of connecting wirelessly to communication system 100. In at least one exemplary embodiment, mobile device 140 includes a cellular telephone, a tablet computer, a laptop, and the like. Mobile device 140 is a device capable of movement from one location to another. As described herein, communication system 100 determines the location of mobile device 140 through using RF pattern matching. As part of the RF pattern matching, the communication system 100 may identify the remote antenna unit 108 through which the mobile device 140 communicates. In one example, mobile device 140 receives information from base station 102 through DAS 101 that indicates the location of the mobile device 140 and displays the information to a user on the mobile device 140. Alternatively, communication system 100 determines the location of mobile device 140 and transmits the information to a third party electronic device, catalogs the information about the location of mobile device 140, or the like.

In certain embodiments, communication system 100 determines the location of mobile device 140 by identifying the remote antenna unit 108 through which mobile device 140 communicates with base station 102. The remote antenna unit 108 relays the signal received from mobile device 140 to hub unit 106, whereupon hub unit 106 combines the relayed signal with other signals received from other remote antenna units 108 and relays the combined signal to base station 102. Because hub unit 106 relays the combined signal to base station 102, the base station 102 receives a single signal representing the combined output from the multiple remote antenna units 108. For example, a first signal relayed between a first remote antenna unit 108 and hub unit 106 and a second signal relayed between a second remote antenna unit 108 and hub unit 106 are combined at hub unit 106. Hub unit 106 then sends the combined signal to base station 102. Base station 102 receives the combined signal that includes the combined components of both the first signal and the second signal. However, while base station 102 communicates with mobile device 140, base station 102 is unable to determine which remote antenna unit 108 is relaying communications between base station 102 and mobile device 140. Because, base station 102 is unable to determine the remote antenna unit 108 that relays communications between base station and mobile device 140, base station 102 is unable to use the signals relayed through the multiple remote antenna units 108 and combined at hub unit 106 to determine the location of mobile device 140. However, in certain exemplary embodiments, DAS 101 changes the characteristics of the signals relayed along different transmission paths between the multiple remote antenna units 108 and hub unit 106 such that base station 102 can distinguish the different transmission paths between remote antenna units 108 and hub unit 106 from information included in the combined signal. Also, the changing of the characteristics of the signals relayed along the different transmission paths may allow the DAS 100 to resolve the locations of the mobile device 140 at a higher resolution.

As used herein, RF pattern matching, generally refers to a method for estimating the location of mobile devices 140 based on radio link measurements collected from a network and/or the mobile devices 140. RF pattern matching relies on predictions or models of the radio environment against which a system, such as the base station 102 or a location unit 112, performs an algorithmic comparison of the measurements to determine a best match estimation of the location of the mobile device 140. For example, the addition of intentional delays through the DAS provides a measurement that can be used in addition with other measurements to differentiate locations within the DAS coverage area. The different delays are measured by a cellular system and aid in determining the location of the mobile device 140.

In at least one exemplary embodiment, DAS 101 delays signals relayed along different transmission paths between hub unit 106 and multiple remote antenna units 108 by different delay times. The diversity of delay times allows base station 102 to distinguish different transmission paths through distributed antenna system 101. Specifically, base station 102 identifies the different transmission paths by the delay time associated with a particular transmission path. By identifying the different transmission paths through the distributed antenna system 101, the base station 102 is able to determine the location of the mobile device 140. As was mentioned earlier, distributed antenna system 101 includes a hub unit 106 and multiple remote antenna units 108. A transmission path through the distributed antenna system 101 is a communication connection between an individual remote antenna unit 108 and hub unit 106. In at least one implementation, a signal that is relayed along a first transmission path is delayed by a period of time that is different than the period of time through which a signal is delayed along a second transmission path. For example, as shown in FIG. 1, a hub unit 106 communicates with three separate remote antenna units 108. Each remote antenna unit 108 relays signals with the hub unit 106 along a different transmission path and signals transmitted along the different transmission paths are delayed by different delay times. For example, the three different transmission paths between the remote antenna units 108 and hub unit 106 are delayed by a first delay 104, a second delay 105, and a third delay 107. In at least one implementation, the downlink delay time from the base station 102 to the mobile device 140 is reported back to the base station 102.

In at least one exemplary embodiment, base station 102 stores information that describes the delays associated with the different transmission paths such that base station 102 is able to identify the remote antenna unit 108 that relayed a received signal. When base station 102 receives a signal from hub unit 106, base station 102 determines the delay of the signal. For example, base station 102 calculates the different delays for the different transmission paths based on the communication protocol followed by the base station 102 when communicating through the DAS 101 with the mobile device 140. When the base station 102 identifies the delay, the base station uses the determined delay to identify the transmission path of the signal according to the stored information on base station 102 that describes the delays associated with the different transmission paths. When the base station 102 determines the transmission path, the base station 102 identifies the remote antenna units communicating with the mobile device 140. For example, base station 102 transmits a downlink message through DAS 101 that is intended for mobile device 140. Mobile device 140 responds to the signal by transmitting an uplink message that is received by and relayed through DAS 101 for reception by base station 102. Both the downlink and uplink messages are delayed by the DAS 101 by different delay times according to the different transmission paths travelled by the relayed messages. When base station 102 receives the uplink message that originated from mobile device 140, base station 102 determines the delay of the signal based on the time that the downlink message was transmitted and the expected response time from mobile device 140. For example, base station 102 determines that the downlink and uplink messages were both delayed by the second delay 105. Base station 102 determines that the uplink and downlink messages were delayed by the second delay 105 and compares the determined delay against the information stored on base station 102 and determines the transmission path associated with second delay 105. Upon identifying the correct transmission path, based on the delay, the base station 102 is able to locate mobile device 140.

In an alternative embodiment, base station 102 determines the delay and then relays a message describing the determined delay to a location unit 112. Location unit 112 uses the determined delay to identify the transmission path and the location of the mobile device 140. For example, base station 102 receives a signal that originated from mobile device 140 that is delayed by the first delay 104. Base station 102 determines that the received signal was delayed by the first delay 104 and then transmits the delay information to location unit 112. Location unit 112 then compares the delay information against information describing the communication system 100 stored on the location unit 112 to determine the transmission path through distributed antenna system 101 and the location of mobile device 140. In one implementation, location unit 112 is part of base station 102. In at least one implementation, to determine the delay, either the distributed antenna system 101 or the base station 102 correlates signals received through the different remote antenna units 108 with an expected time of signal reception. According to time associated with the maximum signal power received through each transmission path through the distributed antenna system 101, the delay for each transmission path may be calculated.

In further embodiments, the location unit 112 uses data other than delay information to determine the location of the mobile device 140. In at least one exemplary implementation, the location unit 112 uses signal strength and cell identification measurements taken by the mobile device 140. For example, the mobile device 140 is in communication with an alternative base station 103 and base station 102. The mobile device 140 identifies and transmits the cell identification of the alternative base station 103 to the base station 102. Upon receiving the cell identification of the alternative base station 103 in communication with mobile device 140, the base station 102 uses the cell identification of the alternative base station 103 to further distinguish the transmission path between hub unit 106 and mobile device 140 and to further determine the location of mobile device 140. In a further example, mobile device 140 further transmits the received signal strength of signals received from the alternative base station 103 to base station 102. Base station 102 uses the received signal strength of signals received from alternative base station 103 in conjunction with cell identifications to further determine the location of mobile device 140. In an alternative exemplary embodiment, base station 102 determines the received signal strength of signals received from mobile device 140 and determines the cell identification of an alternative base station 103 in communication with mobile device 140 and then transmits the received signal strength and the cell identification to location unit 112. Location unit 112 determines the location of mobile device 140 based on the received signal strength, the cell identifications, and the delay of signals relayed between remote antenna units 108 and hub unit 106.

In certain implementations, the period of time that a signal is delayed along a transmission path is constrained to be within a particular time period. One such constraint is that a delay that is too long can negatively affect communications between base station 102 and delays that are too short fail to provide adequate information for determining one transmission path from the other. For example, when the first delay 104 and the third delay 107 are too long, the base station 102 may not be able to reliably communicate with mobile device 140. For example, the length of a delay may be constrained by a certain communication protocol. When a delay becomes too long, the base station 102 will not be able to communicate with the mobile device, because the delay has exceeded the allowable delay for a particular protocol, such that signals are unable to be reliably recovered. Alternatively, when the difference between the first delay 104 and the third delay 107 is too small, the base station 102 will be unable to unambiguously determine the transmission path of a particular signal. Due to the constraints on a delay range, when there are a significant number of remote antenna units connected to a hub unit, some of the different transmission paths between the multiple remote antenna units 108 and hub unit 106 have the same delay. For example, a signal that is transmitted along a first transmission path is delayed by a first delay 104. Further, a signal that is transmitted along a different transmission path is delayed by a third delay 107, where the third delay 107 is equal to the first delay 104.

In at least one implementation, during the design of the distributed antenna system 101, a designer of the distributed antenna system 101 may specifically select the different delay times associated with each of the multiple remote antenna units 108 in the distributed antenna system 101. Thus, a designer of the distributed antenna system 101 may plan the delays such that there is a sufficient delay difference between the delay times associated with adjacent remote antenna units. Further, the designer may be able to avoid having duplicate delay times associated with adjacent remote antenna units. For example, if a certain delay time is used for more than one remote antenna unit, then the designer may specifically select remote antenna units that are sufficiently far apart, or where there are other identifiable characteristics that contribute to the differentiation of signals that pass through the different remote antenna units.

In certain exemplary embodiments, when different transmission paths between multiple remote antenna units 108 and hub unit 106 have the same delay, the base station 102 uses other available distinguishing characteristics of the different transmission paths. In one exemplary embodiment, in conjunction with the delay times, the base station 102 distinguishes the different transmission paths based on the cell identification of alternative base stations 103 in communication with the mobile device 140. Further, the base station 102 also receives an indication of the received signal strength of communications from the first alternative base station 103 that are received by the mobile device 140. To distinguish the signals delayed by the third delay 107 from the signals delayed by the first delay 104, the base station 102 receives cell identification of the third alternative base station 103 received by the mobile device 140. Further, the base station 102 also receives an indication of the received signal strength of communications from the third alternative base station 103 that are received by the mobile device 140. The reception of signals and information associated with different alternative base station 103 aid base station 102 in identifying the different transmission paths when the different transmission paths delay relayed signals by the same delay time. Further, other parameters, such as a received signal strength indication (RSSI) and cell ID, may also be used to differentiate possible locations where the transmission paths are delayed by the same delay time.

In one embodiment, signals relayed between remote antenna units 108 and hub unit 106 are delayed by the length of a transmission path between remote antenna units 108 and hub unit 106. For example, the first delay 104, second delay 105, and third delay 107 are implemented by connecting each individual remote antenna unit 108 that is connected to hub unit 106 by a different length of communicative cable such as coaxial cable, optical fiber, and the like. Alternatively, signals, relayed between remote antenna units 108 and hub unit 106, are delayed by digitally delaying the signals in either the remote antenna units 108 or in the hub unit 106. In at least one implementation, the delays digitally added in the remote antenna units 108 are configured by an external device and can be reconfigured either directly or through commands received through base station 102. Alternatively, when the signals are digitally delayed in the hub unit 106, the individual signals received along the separate transmission paths from the remote unit 108 are individually delayed before the signals are combined in the hub unit 106 for transmission to base station 102. In a similar manner to delays that are implemented by remote antenna units 108, in at least one exemplary implementation, the delays digitally added in the hub unit 106 are configured by an external device and can be reconfigured either directly or through commands received through base station 102.

In a further implementation, the different delays can further aid in determining the location of a mobile device 140, through the creation of a multipath profile. For example, if the mobile device 140 is communicating with the base station 102 through the distributed antenna system 101, transmitted signals may reflect off surfaces in the environment. The reflections can be received by either the distributed antenna system 101 or by the mobile device 140 as a composite signal comprised of the sum of signals containing the same data, but offset from one another in time and amplitude, according to the different distances the signal travels when it reflects off of surfaces. When the distributed antenna system or base station receives the composite signal, the receiving system may correlate the composite received signal with a single reference signal representing the expected receive signal. The correlation will produce multiple peaks at different times and different amplitudes where each peak corresponds to a reflected signal. When the correlation is performed, information describing the produced multiple peaks may be saved as a multipath profile that is associated with the location of the mobile device 140. The multipath profile then may be used as a further differentiator for identifying the location of a mobile device 140. In one embodiment, the multipath profile contains at least the time and amplitude of the produced multiple peaks.

Figure 2:
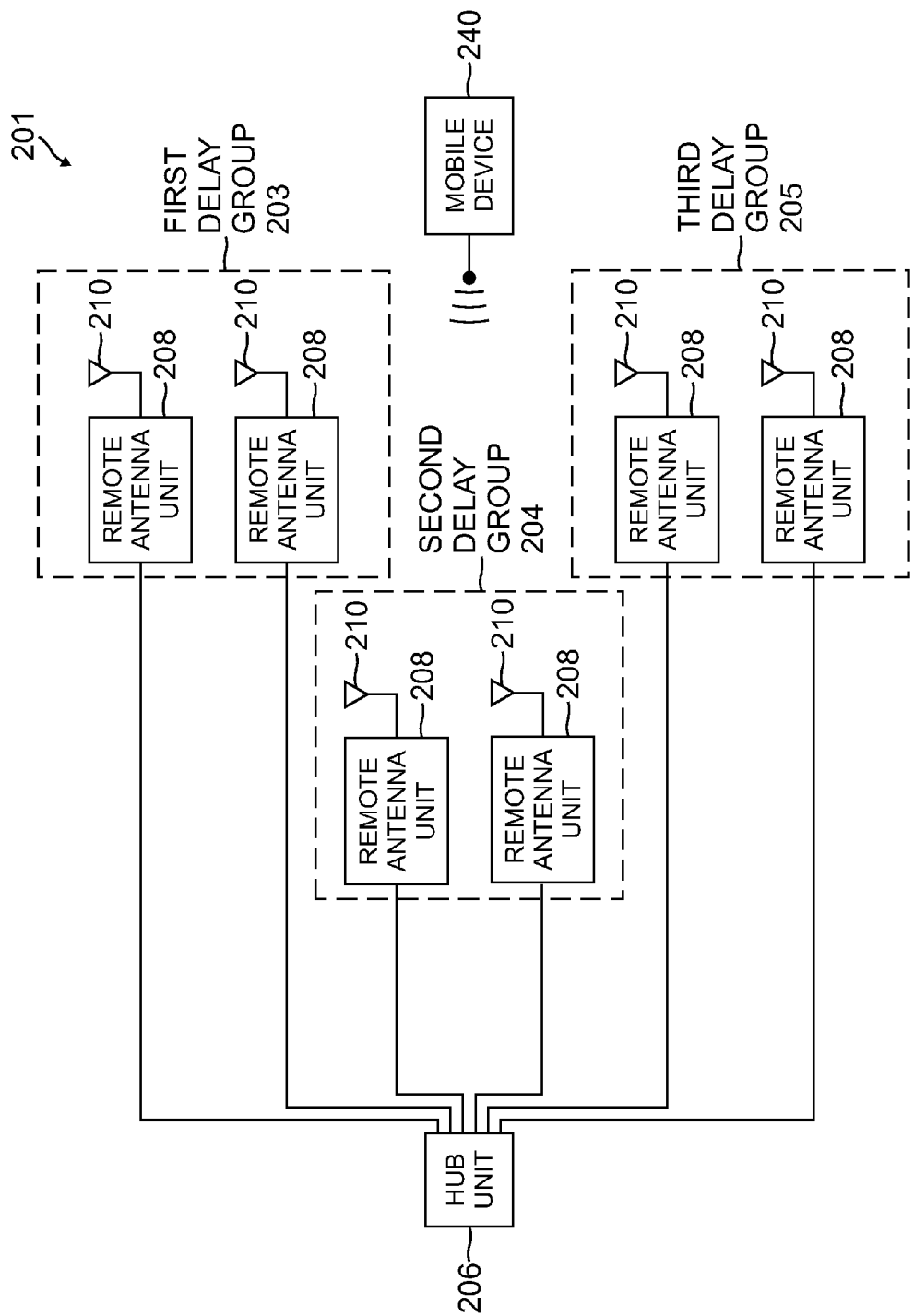
FIG. 2 is a block diagram of one high-level embodiment of a distributed antenna system configured to control the granularity of signal diversification.

FIG. 2 is a block diagram of one high-level embodiment of a distributed antenna system 201 configured to control the granularity of signal diversification. Distributed antenna system 201 is similar to distributed antenna system 101 in FIG. 1. In particular, distributed antenna system 201 includes hub unit 206, remote antenna units 208, and antennas 210 which function similarly to hub unit 106, remote antenna units 108, and antennas 110. In certain embodiments, distributed antenna system 201 may be subject to multiple constraints that affect the ability of a base station 102 in FIG. 1 from distinguishing the different transmission paths between remote antenna units 208 and hub unit 206. These constraints include a limited range of possible delays, limited processor capabilities, requirements for accuracy in determining the location of a mobile device 240, and the like. In certain embodiments, to accommodate the different constraints on the configuring of delays along the different transmission paths, signals from groups of remote antenna units 108 can be subject to the same delay. For example, as shown in FIG. 2, the remote antenna units 108 are divided into three separate groups: a first delay group 203, a second delay group 204, and a third delay group 205. In one implementation, when the remote antenna units 208 are divided into separate groups, the remote antenna units 208 are divided into separate groups based on the location of the remote antenna units 208 in relation to one another.

Figure 3:
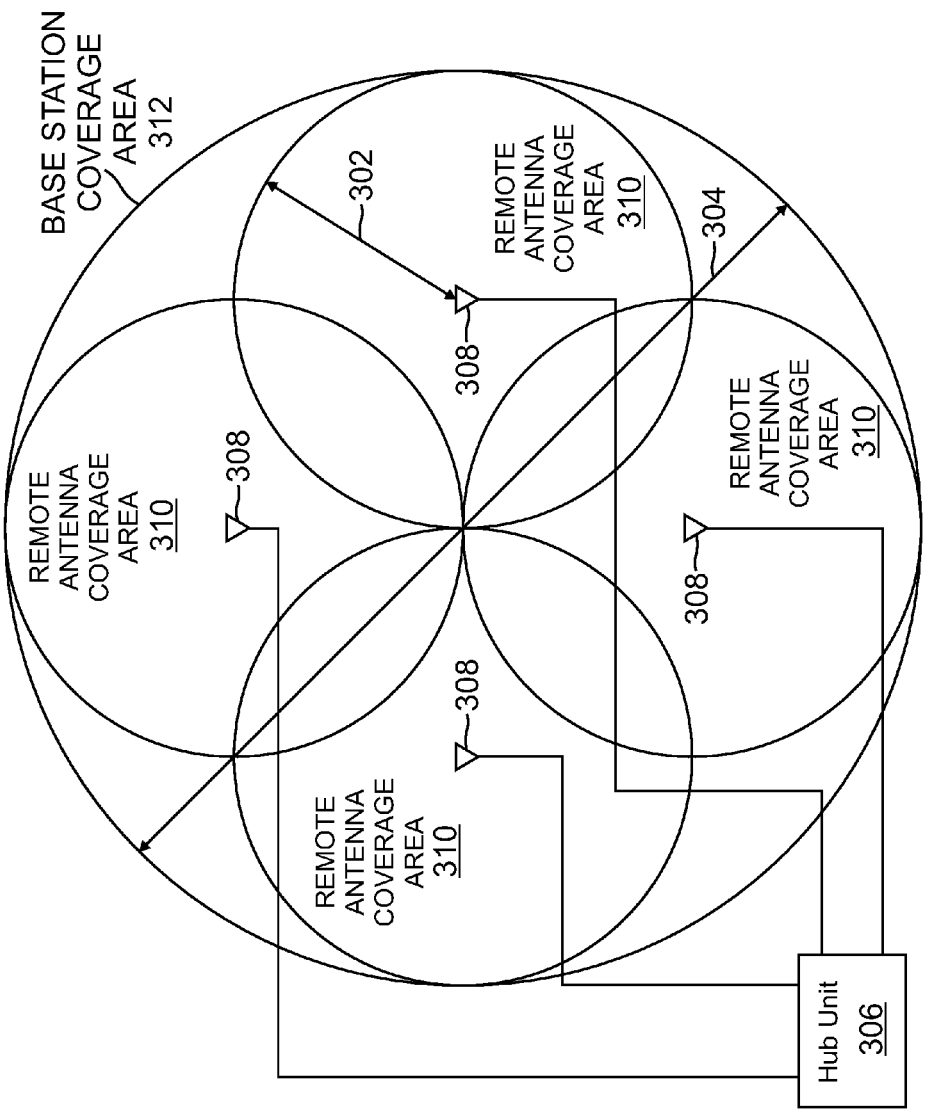
FIG. 3 is a block diagram of one high level embodiment of a distributed antenna system configured to delay signals for the diversifying of signals received through different remote antenna units.

FIG. 3 is a block diagram of one high level embodiment of a distributed antenna system 301 configured to delay signals for the diversifying of signals received through different remote antenna units 308. In certain implementations, to unambiguously identify the different transmission paths between the remote antenna units 308 and the hub unit 306, the configuration of delay times is subject to the communication protocol followed when communicating with a mobile device. Alternatively, the configuration of delay times may also be subject to certain constraints that are dependent on the size of a remote antenna coverage area 310 and a base station coverage area 312. As used herein, a remote antenna coverage area 310 refers to the coverage area associated with a remote antenna unit 308 and a base station coverage area 312 refers to an area that reflects the combined coverage area of the remote antenna units 308 connected to the hub unit 306.

When the configuration of delay times is subject to a communication protocol, the communication protocol may define a minimum resolution that constrains the minimum delay for a transmission path. Likewise, a communication protocol may define a maximum allowable delay time, such as a search window, where the maximum allowable delay time defines a time window for responding to transmissions. In certain protocols, if a message is not received within a defined time window, a device that is expecting the message may proceed as if the message was not sent. As there is a finite time window for transmission, the maximum allowable delay time may function as an upper bound when configuring the delay times for the different transmission paths.

In a further exemplary embodiment, to unambiguously determine the different transmission paths between the remote antenna units 308 and hub unit 306, the signals relayed along the transmission paths are delayed by a delay time that is greater than the remote antenna coverage area propagation time 302 but less than the configured base station maximum coverage area propagation time 304. For example, if propagation time 302 is 30 ns and the configured base station maximum coverage area propagation time is 10 µs, a signal relayed between remote antenna units 308 and hub unit 306 is delayed a period of time that is greater than propagation time 302 (30 ns) but less than the configured base station maximum coverage area propagation time 304 (10 µs). A delay period greater than propagation time 302 prevents the same signal from being received by the base station from two different transmission paths simultaneously. Further, a delay period less than the configured base station maximum coverage area propagation time 304 allows the base station to communicate with the mobile device through the DAS.

Figure 4:
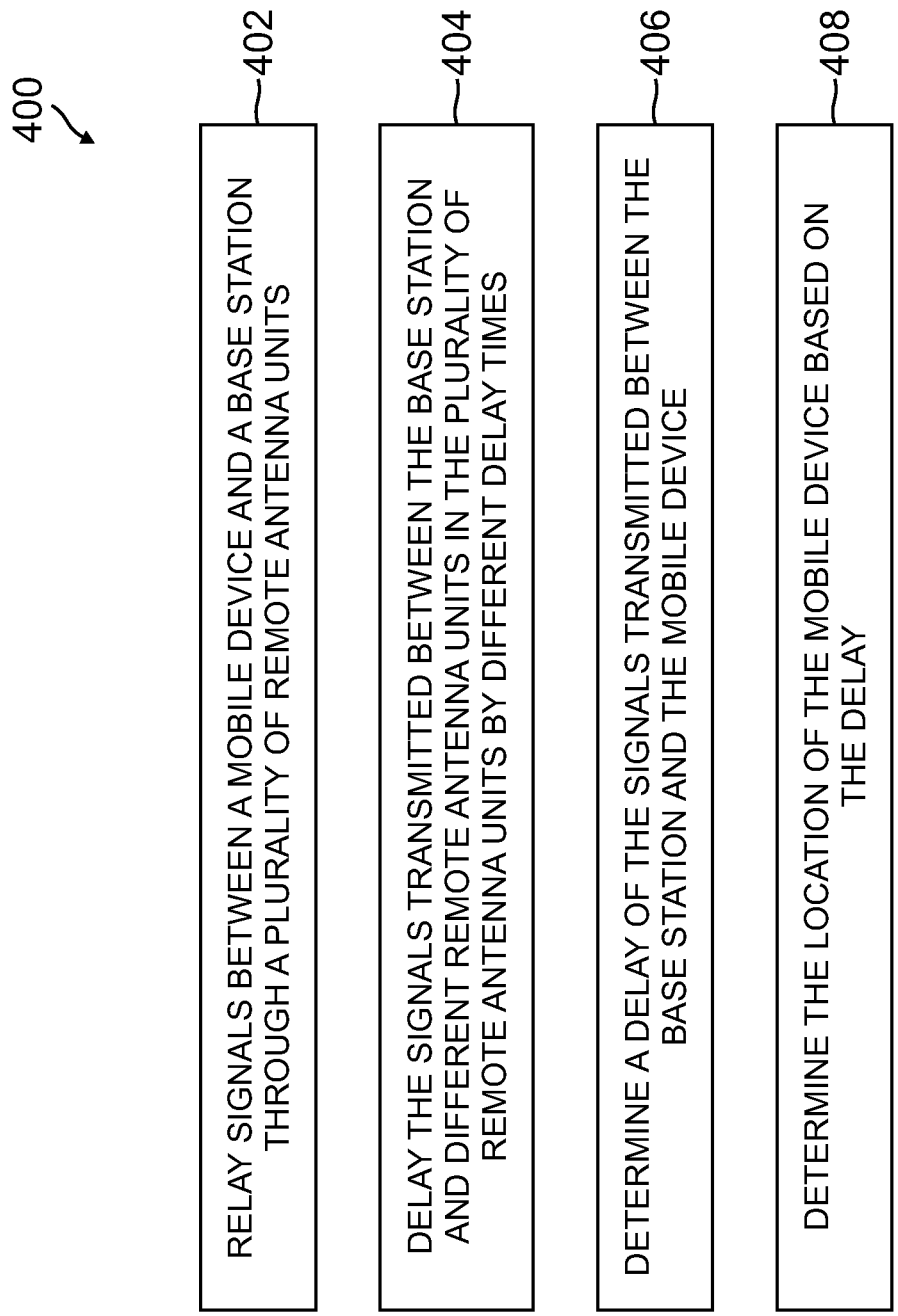
FIG. 4 is a flow diagram of one exemplary embodiment of a method for determining the location of a mobile device.

FIG. 4 is a flow diagram of one exemplary embodiment of a method 400 of determining the location of a mobile device 140. The embodiment of method 400 shown in FIG. 4 is described here as being implemented in the system 100 of FIG. 1 though other embodiments can be implemented in other ways.

Method 400 comprises relaying signals between a mobile device 140 and a base station 102 through a plurality of remote antenna units 108 (block 402). Base station 102 communicates with mobile device 140 through a distributed antenna system 101. For example, base station 102 transmits a downlink message to mobile device 140 through a hub unit 106 in DAS 101, where hub unit 106 relays the message to the plurality of remote antenna units 108. The plurality of remote antenna units 108 then relay the downlink message through an antenna 110 to the mobile device 140. The mobile device 140 receives the downlink message that was relayed by a remote antenna unit 108 in the plurality of remote antenna units 108. Further, mobile device 140 transmits an uplink message that is received through at least one remote antenna unit 108 in the plurality of remote antenna units 108. The remote antenna unit 108, through which the uplink message is received, relays the uplink message to hub unit 106, whereupon, hub unit 106 combines the received uplink message with the signals received from other remote antenna units in the plurality of remote antenna units 108. The hub unit 106, then relays the combined uplink message to the base station 102.

Method 400 further comprises delaying the signals transmitted between the base station and different remote antenna units in the plurality of remote antenna units by different delay times (block 404). For example, when a signal is relayed between hub unit 106 and the plurality of remote antenna units 108, the signal is delayed by a defined delay time. Further, the different transmission paths for the relaying of signals between hub unit 106 and mobile device 140 through the plurality of remote antenna units 108 delay the signals by different delay times. In one embodiment, the signals are delayed by the physical transmission distance between hub unit 106 and the plurality of remote antenna units 108. Alternatively, the signals are digitally delayed by either the hub unit 106, the plurality of remote antenna units 108, or both.

Method 400 further comprises determining a delay of the signals transmitted between the base station 108 and the mobile device 140 (block 406). For example, base station 102 determines the delay of the received uplink messages that were transmitted from mobile device 140. In at least one embodiment, base station 102 transmits a downlink message to mobile device 140 through DAS 101. As a response to the downlink message, base station 102 receives an uplink message from mobile device 140. When the uplink message is received, base station 102 compares the reception time of the uplink message against the time that the uplink message was scheduled to be received.

Method 400 also comprises determining the location of the mobile device based on the delay. In at least one exemplary embodiment, when base station 102 determines the delay of the uplink message transmitted from mobile device 140, base station 102 compares the delay against data stored on base station 102 that describes the delays associated with the different transmission paths through the plurality of remote antenna units 108. Further, the base station 102 also stores information that describes the location of the different remote antenna units 108. Base station 102 uses information about the location of the remote antenna unit 108 that relayed the uplink message to base station 102 to determine the location of the mobile device 140. In an alternative embodiment, the base station 102 transmits information describing the determined delay to a location unit 112, whereupon the location unit 112 uses the delay information to identify the location of the mobile device 140.

EXAMPLE EMBODIMENTS

Example 1 includes a system for determining the location of a mobile device, the system comprising: a distributed antenna system configured to relay signals to and from the mobile device, the distributed antenna system comprising: a hub unit; and a plurality of remote antenna units coupled to the hub unit, wherein signals relayed between the plurality of remote antenna units and the hub unit are delayed such that at least two signal paths between the plurality of remote antenna units and the hub unit have different delay times; a base station coupled to the hub unit, wherein the base station receives the signals from the hub unit and determines the delay of signals transmitted between the mobile device and the base station; and wherein the system is configured to determine the location of the mobile device by using the delay determined by the base station.

Example 2 includes the system of Example 1, wherein the delay determined by the base station is used as a parameter in RF pattern matching to determine the location of the mobile device.

Example 3 includes the system of any of Examples 1-2, further comprising a location unit coupled to the base station, wherein the location unit is configured to determine the location of the mobile device based on the delay determined by the base station.

Example 4 includes the system of Example 3, wherein the location unit is a part of the base station.

Example 5 includes the system of any of Examples 1-4, wherein the signals relayed between different remote antenna units in the plurality of remote antenna units and the hub unit are configured to have certain delays.

Example 6 includes the system of Example 5, wherein the certain delays are configured by at least one of: the base station; the hub unit; and a designer of the system.

Example 7 includes the system of any of Examples 1-6, wherein the system is configured to determine the location of the mobile device based on at least one of: a received signal strength of at least one signal received by the mobile device from at least one alternative base station; an identification of the at least one alternative base station in communication with the mobile device.

Example 8 includes the system of any of Examples 1-7, wherein the distributed antenna system is configured to physically delay at least some of the signals relayed between the plurality of remote antenna units and the hub unit.

Example 9 includes the system of any of Examples 1-8, wherein the distributed antenna system is configured to digitally delay at least some of the signals relayed between the plurality of remote antenna units and the hub unit.

Example 10 includes the system of any of Examples 1-9, wherein at least some of the plurality of remote antenna units are configured to delay at least some of the signals relayed between the plurality of remote antenna units and the hub unit.

Example 11 includes the system of Example 10, wherein the distributed antenna system is configured to digitally delay at least some of the signals relayed between the plurality of remote antenna units and the hub unit in a reconfigurable manner.

Example 12 includes the system of any of Examples 1-11, wherein at least some of the signals are delayed by a delay time that has a longer duration than a minimum resolution as determined by a communication protocol.

Example 13 includes the system of any of Examples 1-12, wherein at least some of the signals are delayed by a delay time that has a shorter duration than the maximum allowable delay defined by the communication protocol being used.

Example 14 includes the system of any of Examples 1-13, wherein the hub unit combines the signals received from the plurality of remote antenna units.

Example 15 includes the system of any of Examples 1-14, wherein information regarding the delays is provided by at least one of: providing information that associates signal power of the signals with the different delay times; and correlating the signals received through the plurality of remote antenna units.

Example 16 includes the system of any of Examples 1-15, wherein the system is further configured to determine the location of the mobile device by associating signals received from the mobile device with a multipath profile associated with a location.

Example 17 includes a method for determining a location of a mobile device, the method comprising: relaying signals between a mobile device and a base station through a plurality of remote antenna units; delaying the signals relayed between the base station and different remote antenna units in the plurality of remote antenna units by different delay times; determining a delay of the signals relayed between the base station and the mobile device, wherein the signal is relayed through the plurality of remote antenna units; and determining the location of the mobile device based on the delay.

Example 18 includes the method of Example 17, wherein delaying the signals comprises digitally delaying the signals.

Example 19 includes the method of any of Examples 17-18, wherein digitally delaying the signals comprises delaying at least some of the relayed signals in a reconfigurable manner.

Example 20 includes a distributed antenna system comprising: a hub unit; and a plurality of remote antenna units configured to communicate with at least one mobile device, wherein signals relayed between the plurality of remote antenna units and the hub unit along different transmission paths are delayed by different delay times, wherein the hub unit combines received signals from the plurality of remote antenna units, and transmits the combined signal to a base station system, wherein the base station system determines a delay time for the signals in the combined signal and a location unit determines the location of the at least one mobile device.

Example 21 includes the system of Example 20, wherein the hub unit combines the signals using an analog summer.

Example 22 includes the system of any of Examples 20-21, wherein the hub unit combines the signals using a digital summer.

Example 23 includes the system of any of Examples 20-22, wherein the distributed antenna system is configured to digitally delay at least some of the signals relayed between the plurality of remote antenna units and the hub unit in a reconfigurable manner.

Example 24 includes the system of any of Examples 20-23, wherein the location unit is part of the base station system.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present disclosure. Therefore, it is manifestly intended that this disclosure be limited only by the claims and the equivalents thereof.

What is claimed is:

1. A system for determining the location of a mobile device, the system comprising:
   a distributed antenna system configured to relay signals to and from the mobile device, the distributed antenna system comprising:
   a hub unit; and
   a plurality of remote antenna units coupled to the hub unit, wherein signals relayed between the plurality of remote antenna units and the hub unit are delayed such that at least two signal paths between the plurality of remote antenna units and the hub unit have different delay times; and
   a base station coupled to the hub unit, wherein the base station receives the signals from the hub unit and determines the delay of signals transmitted between the mobile device and the base station;
   wherein the system is configured to determine the location of the mobile device by using the delay determined by the base station; and
   wherein at least some of the signals are delayed by a delay time that has a shorter duration than a maximum allowable delay defined by a communication protocol being used.

2. The system of claim 1, wherein the delay determined by the base station is used as a parameter in RF pattern matching to determine the location of the mobile device.

3. The system of claim 1, further comprising a location unit coupled to the base station, wherein the location unit is configured to determine the location of the mobile device based on the delay determined by the base station.

4. The system of claim 3, wherein the location unit is a part of the base station.

5. The system of claim 1, wherein the different delay times are configurable.

6. The system of claim 5, wherein the different delay times are configured by at least one of:
   the base station; and
   the distributed antenna system.

7. The system of claim 1, wherein the system is configured to determine the location of the mobile device based on at least one of:
   a received signal strength of at least one signal received by the mobile device from at least one alternative base station;
   an identification of the at least one alternative base station in communication with the mobile device.

8. The system of claim 1, wherein the distributed antenna system is configured to physically delay at least some of the signals relayed between the plurality of remote antenna units and the hub unit.

9. The system of claim 1, wherein the distributed antenna system is configured to digitally delay at least some of the signals relayed between the plurality of remote antenna units and the hub unit.

10. The system of claim 1, wherein at least some of the plurality of remote antenna units are configured to delay at least some of the signals relayed between the plurality of remote antenna units and the hub unit.

11. The system of claim 10, wherein the distributed antenna system is configured to digitally delay at least some of the signals relayed between the plurality of remote antenna units and the hub unit in a reconfigurable manner.

12. The system of claim 1, wherein at least some of the signals are delayed by a delay time that has a longer duration than a minimum resolution as determined by a communication protocol.

13. The system of claim 1, wherein the hub unit combines the signals received from the plurality of remote antenna units.

14. The system of claim 1, wherein information regarding the delays is provided by at least one of:
   providing information that associates signal power of the signals with the different delay times; and
   correlating the signals received through the plurality of remote antenna units.

15. The system of claim 1, wherein the system is further configured to determine the location of the mobile device by associating signals received from the mobile device with a multipath profile associated with a location.

16. A method for determining a location of a mobile device, the method comprising:
   relaying signals between a mobile device and a base station through a plurality of remote antenna units;
   delaying the signals relayed between the base station and different remote antenna units in the plurality of remote antenna units by different delay times;
   determining a delay of the signals relayed between the base station and the mobile device, wherein the signal is relayed through the plurality of remote antenna units; and
   determining the location of the mobile device based on the delay;
   wherein at least some of the signals are delayed by a delay time that has a shorter duration than a maximum allowable delay defined by a communication protocol being used.

17. The method of claim 16, wherein delaying the signals comprises digitally delaying the signals.

18. The method of claim 16, wherein digitally delaying the signals comprises delaying at least some of the relayed signals in a reconfigurable manner.

19. A distributed antenna system comprising:
   a hub unit; and
   a plurality of remote antenna units configured to communicate with at least one mobile device, wherein signals relayed between the plurality of remote antenna units and the hub unit along different transmission paths are delayed by different delay times,
   wherein the hub unit combines received signals from the plurality of remote antenna units, and transmits the combined signal to a base station system, wherein the base station system determines a delay time for the signals in the combined signal and a location unit determines the location of the at least one mobile device; and
   wherein at least some of the signals are delayed by a delay time that has a shorter duration than a maximum allowable delay defined by a communication protocol being used.

20. The system of claim 19, wherein the hub unit combines the signals using an analog summer.

21. The system of claim 19, wherein the hub unit combines the signals using a digital summer.

22. The system of claim 19, wherein the distributed antenna system is configured to digitally delay at least some of the signals relayed between the plurality of remote antenna units and the hub unit in a reconfigurable manner.

23. The system of claim 19, wherein the location unit is part of the base station system.

* * * * *